(12) United States Patent
Richter et al.

(10) Patent No.: US 8,733,817 B2
(45) Date of Patent: May 27, 2014

(54) LATERALLY PIVOTING TRIM PIECE FOR A Z-FOLD CONVERTIBLE TOP

(71) Applicant: Magna Car Top Systems GmbH, Troy, MI (US)

(72) Inventors: Wolfgang Richter, Commerce Township, MI (US); Philipp Wolf, Stuttgart (DE); Robert E. Fallis, III, Rochester, MI (US)

(73) Assignee: Magna Car Top Systems GmbH, Troy, MI (US)

( * ) Notice: Subject to any disclaimer, the term of this patent is extended or adjusted under 35 U.S.C. 154(b) by 0 days.

(21) Appl. No.: 13/654,685

(22) Filed: Oct. 18, 2012

(65) Prior Publication Data

US 2013/0093207 A1    Apr. 18, 2013

Related U.S. Application Data

(60) Provisional application No. 61/548,382, filed on Oct. 18, 2011.

(51) Int. Cl.
*B60J 7/12*  (2006.01)

(52) U.S. Cl.
USPC ................................. 296/107.09; 296/116

(58) Field of Classification Search
USPC .................... 296/116, 117, 122, 123, 107.09, 296/107.11, 107.12, 107.16
See application file for complete search history.

(56) References Cited

U.S. PATENT DOCUMENTS

| 5,620,226 | A | 4/1997 | Sautter, Jr. | |
|---|---|---|---|---|
| 6,048,021 | A | 4/2000 | Sautter, Jr. | |
| 6,416,111 | B1 | 7/2002 | Neubrand | |
| 6,464,284 | B2 | 10/2002 | Neubrand | |
| 6,629,719 | B2 | 10/2003 | Sims | |
| 6,666,494 | B2 * | 12/2003 | Antreich | 296/107.01 |
| 6,802,554 | B1 * | 10/2004 | Just et al. | 296/107.09 |
| 6,966,599 | B2 | 11/2005 | Willard | |
| 7,334,831 | B2 | 2/2008 | Wezyk et al. | |
| 7,497,498 | B2 * | 3/2009 | Theuerkauf | 296/107.09 |
| 7,658,008 | B2 | 2/2010 | Just et al. | |
| 7,690,716 | B2 * | 4/2010 | Dilluvio | 296/107.09 |
| 8,002,326 | B2 | 8/2011 | Neubrand | |
| 8,025,328 | B2 | 9/2011 | Dilluvio et al. | |
| 8,042,856 | B2 | 10/2011 | Willard et al. | |
| 2002/0084673 | A1 | 7/2002 | Neubrand | |
| 2003/0038501 | A1 * | 2/2003 | Heselhaus | 296/107.09 |
| 2004/0046415 | A1 | 3/2004 | Heselhaus | |
| 2004/0262942 | A1 | 12/2004 | Willard | |
| 2006/0061129 | A1 * | 3/2006 | Dilluvio | 296/107.09 |
| 2006/0097542 | A1 * | 5/2006 | Dilluvio | 296/107.09 |

(Continued)

*Primary Examiner* — Jason S Morrow
(74) *Attorney, Agent, or Firm* — Brooks Kushman P.C.

(57) ABSTRACT

A convertible top comprising a plurality articulated rail links that move the convertible top in a fore-and-aft direction. A trim piece carries a window seal and is assembled to at least one of the rail links for movement in the fore-and-aft direction. The trim piece also moves in a lateral direction outwardly when the top is retracted and in the lateral direction inwardly when the top is extended. A stop member is secured to the trim piece and at least one rail link to limit the lateral movement of the trim piece relative to the at least one rail link. A cam block is secured to the trim piece and at least one of the rail links to guide the lateral movement of the trim piece relative to the at least one rail link.

14 Claims, 3 Drawing Sheets

(56) References Cited

U.S. PATENT DOCUMENTS

| | | | |
|---|---|---|---|
| 2007/0102954 A1* | 5/2007 | Wezyk et al. | 296/107.09 |
| 2008/0284200 A1* | 11/2008 | Dilluvio et al. | 296/107.09 |
| 2010/0156136 A1* | 6/2010 | Neubrand | 296/107.16 |
| 2010/0164247 A1* | 7/2010 | Neubrand | 296/116 |
| 2010/0187854 A1 | 7/2010 | Willard | |

* cited by examiner

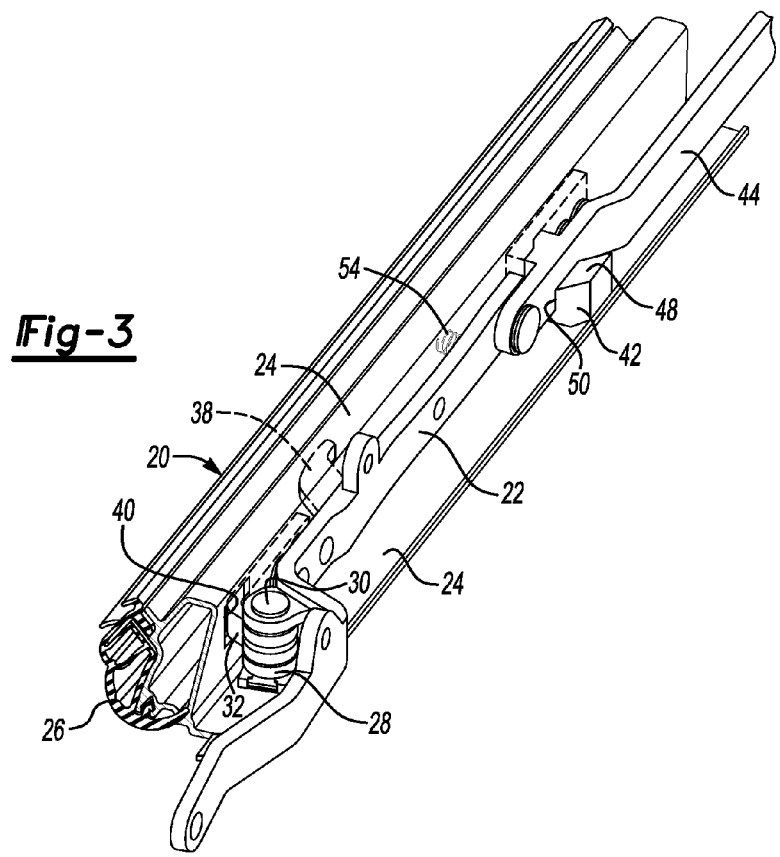
*Fig-3*
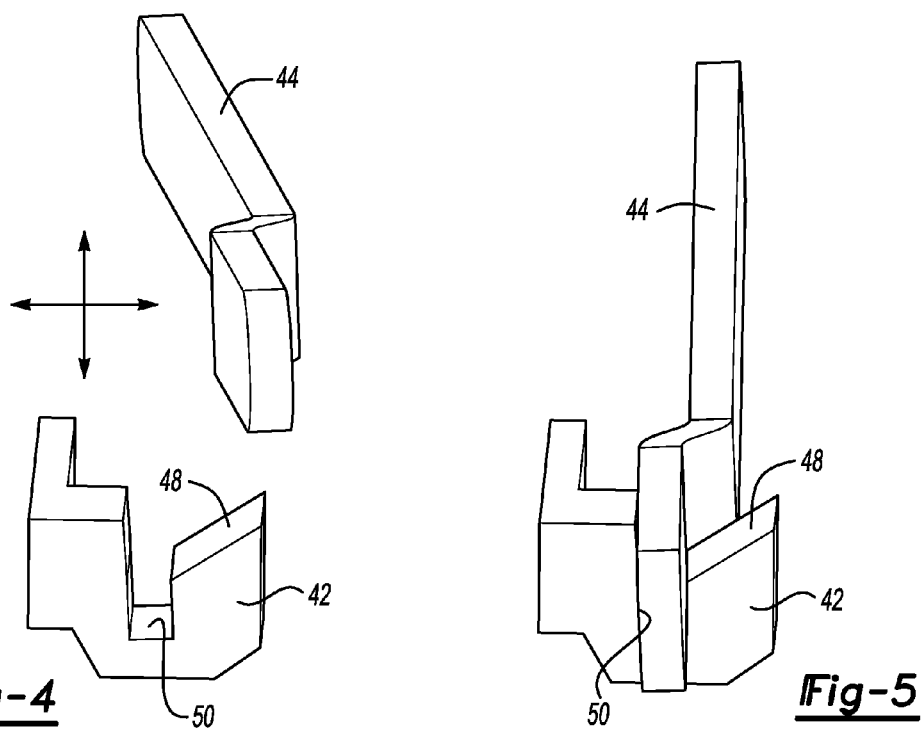
*Fig-4*  *Fig-5*

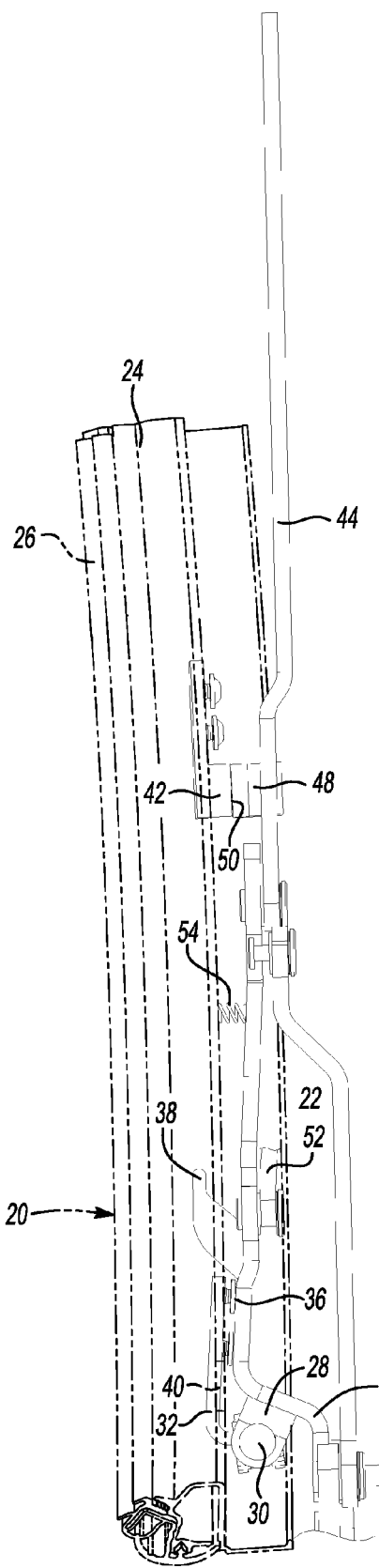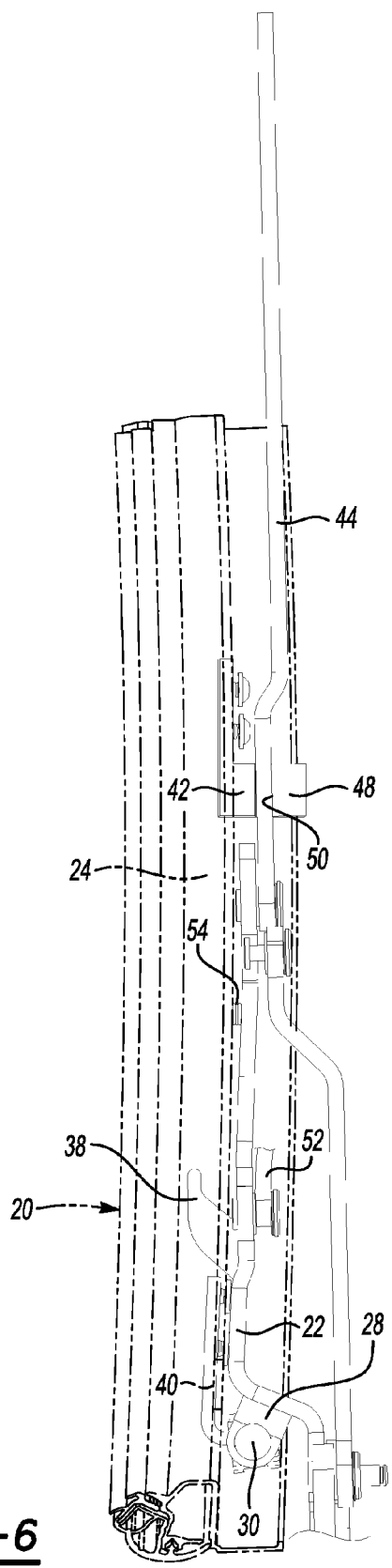

LATERALLY PIVOTING TRIM PIECE FOR A Z-FOLD CONVERTIBLE TOP

CROSS-REFERENCE TO RELATED APPLICATIONS

This application claims the benefit of U.S. provisional Application No. 61/548,382 filed Oct. 18, 2011, the disclosure of which is incorporated in its entirety by reference herein.

TECHNICAL FIELD

The present invention relates to a trim piece that is attached to a side rail link of a convertible top.

BACKGROUND

Convertible tops for vehicles include articulated links on opposite sides of the vehicle that are interconnected by a plurality of bows and covered by a flexible fabric covering. The articulated links generally pivot about pivot pins or joints that have a transverse pivot axis. The spacing between the articulated links generally remain the same regardless of whether the convertible top is in its extended or retracted position. Seals and other parts of the roof structure also maintain the same lateral spacing throughout the range of positions of the convertible top.

When the convertible top is in its retracted position, the side rails are retracted into the area between the outer body panel of the vehicle and the inner walls of the passenger compartment. The area around the rear seat compartment receives the convertible top and articulating links when the top is retracted. The space required for storing the articulating side links, seals and related structures attached to the center rail link tend to reduce the space available in the rear seat at the shoulder or torso area.

There is a need to provide additional passenger compartment space in Z-fold convertible top vehicles without unduly increasing the cost of the convertible top.

These and other problems are addressed by Applicants' invention as described below.

SUMMARY

According to one aspect of this disclosure, a convertible top is disclosed that comprises a plurality of links including a center rail link, a front rail link and a rear rail link that move the convertible top in a fore-and-aft direction. The convertible top also includes a center rail trim piece that carries a window seal and is assembled to the center rail link to move with the center rail link in the fore-and-aft direction. The center rail trim piece also moves in a laterally outboard direction when the top is retracted and in a laterally inboard direction when the top is extended.

The convertible top may further comprise a pivot bracket that includes a pivot pin that connects a first end of the center rail trim piece to the center rail link. A second end of the center rail trim piece may pivot about the pin to move the center rail trim piece in the laterally outboard direction and in the laterally inboard direction.

A stop member may be secured to one of the center rail trim piece and the center rail link to limit the lateral movement of the center rail trim piece relative to the center rail link. The stop member may be a stop finger attached to the center rail link. The center rail trim piece may define an aperture and the stop finger may extend through the aperture to engage a portion of the center rail trim piece that faces away from the center rail link.

A cam block may be secured to one of the center rail trim piece and the center rail link that guides the lateral movement of the center rail trim piece relative to the center rail link. The cam block may be secured to the center rail trim piece and may include a cam surface that leads into a nesting slot. The front rail link may follow the cam surface as the top is extended until the front rail link is received in the nesting slot to move the center rail trim piece in the inboard direction.

The convertible top may include a spring that is operatively connected to the center rail trim piece and the center rail link that biases the center rail trim piece in the outboard direction.

According to other aspects of this disclosure, a rail assembly is disclosed for a convertible top that has a plurality of bows that support a flexible cover. The convertible top is moved in a longitudinal direction between a retracted position and an extended position. The rail assembly comprises a rail link that cooperates with a plurality of other rail links to move the convertible top between the retracted position and the extended position. A trim piece that supports a window seal is attached to the rail link by a pivot pin that connects a first end portion of the trim piece to the rail link. A second end portion of the trim piece is moved in a lateral direction that is perpendicular to the longitudinal direction as the convertible top is moved between the retracted position and the extended position to locate the trim piece at a selected lateral position relative to the rail link.

Another aspect of this disclosure relates to a convertible top that includes a plurality of articulated rail links that move the convertible top in a fore-and-aft direction and that is connected to a trim piece that carries a window seal. The trim piece is assembled to at least one of the rail links to move with the at least one rail link in the fore-and-aft direction. The trim piece also moves in a lateral direction outwardly when the top is retracted and in the lateral direction inwardly when the top is extended. A stop member is secured to one of the trim piece and the at least one rail link that limits the lateral movement of the trim piece relative to the at least one rail link. A cam block may be secured to one of the trim piece and the rail link that guides the lateral movement of the trim piece relative to the at least one rail link.

These and other aspects of this disclosure will be described in greater detail with reference to the attached drawings in the following detailed description of the illustrated embodiment of the disclosure.

BRIEF DESCRIPTION OF THE DRAWINGS

FIG. 3 is a perspective view of part of the convertible top linkage, center rail trim piece, and window opening seal;

FIG. 4 is a diagrammatic perspective view of a front link of a four bar linkage and a cam block disengaged from each other;

FIG. 5 is a diagrammatic perspective view of the front link of the four bar linkage shown as received in a nesting slot of the cam block;

FIG. 6 is a fragmentary plan view of a convertible top linkage with the center rail trim piece and window opening seal pivoted outwardly in the refracted position; and FIG. 7 is a fragmentary plan view of a convertible top linkage with the center rail trim piece and window opening seal pivoted inwardly in the top extended position.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
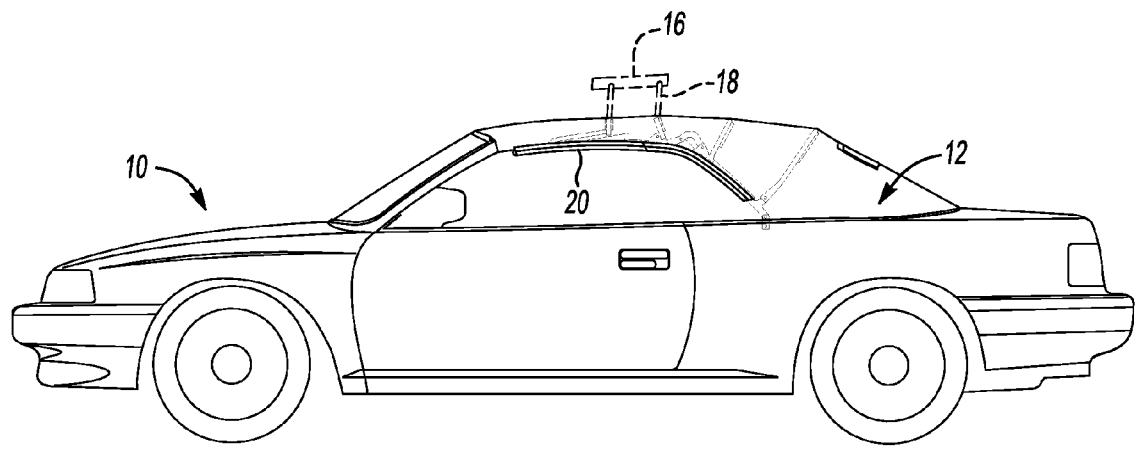
FIG. 1 is a side elevation view of a vehicle having a Z-fold convertible top.

Referring to FIG. 1, a vehicle 10 is shown that includes a Z-fold convertible top 12. The Z-fold convertible top includes a front panel 16 that also functions as a partial tonneau when the convertible top 12 is retracted. A four bar linkage 18 connects the front panel/tonneau 16 to a center rail assembly 20 of the convertible top 12.

Figure 2:
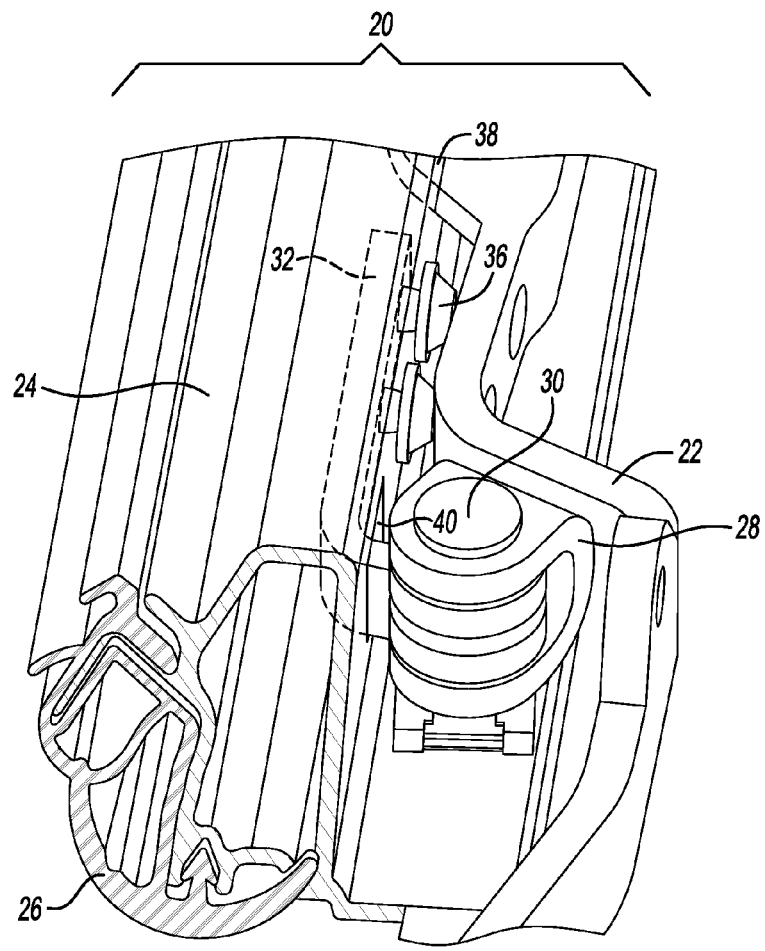
FIG. 2 is a fragmentary perspective view of a pivot bracket connecting a center rail trim piece and window aperture seal to a center rail link.

Referring to FIGS. 2 and 3, a center link 22 is shown with the center rail assembly 20 that includes a center rail trim piece 24 and a window opening seal 26. The window opening seal 26 is engaged by the window of the vehicle when the window is raised. The center rail trim piece 24 is connected to the center rail link 22 by a pivot bracket 28. The pivot bracket 28 includes a pivot pin 30 that secures a hinge flange 32 to the pivot bracket 28. The hinge flange 32 is connected to the center rail trim piece 24. The center rail trim piece 24 pivots in an outward direction as the convertible top 12 is refracted into the vehicle 10 shown in FIG. 1. Fasteners 36 secure the hinge flange 32 to the center rail trim piece 24. A stop finger 38 is provided as part of the center rail link 22 that is partially shown in FIG. 2 and is fully illustrated in FIG. 3. The stop finger 38 is inserted through an aperture 40 defined by the center rail trim piece 24. The stop finger 38 limits the pivoting movement of the center rail assembly 20 in the outward pivoting direction.

Referring to FIGS. 3-5, a cam block 42 is attached to the center rail trim piece 24. The center rail trim piece 24 is returned to its inboard position when a front link 44 of the four bar linkage 18 is returned to its extended position to cover the passenger compartment of the vehicle 10. As best shown in FIGS. 4 and 5, the front link 44 approaches the cam block 42 during the extension cycle and contacts the cam surface 48. Movement of the front link 44 down the cam surface 48 causes the center rail assembly 22 to move inwardly. The front link 44 is received in a nesting slot 50 defined by the cam block 42. As shown in FIG. 4, the front link is disposed above the cam block 42. In FIG. 5, the front link 44 is shown fully received within the nesting slot 50 of the cam block 42.

Referring to FIGS. 6 and 7, the center rail assembly 20 is shown in an outwardly pivoted position in FIG. 6 and in an inwardly pivoted position in FIG. 7. The center rail assembly 20 is secured to pivot relative to the pivot bracket 28 on a pivot pin 30. The pivot bracket 28 is attached to the center link 22. The stop finger 38 shown received within the center rail trim piece 24 and extends through the aperture 40. As shown in FIG. 6, the stop finger 38 is disposed adjacent to the center rail trim piece 24 to limit the outward movement of the center rail assembly 20. As shown in FIG. 7, the stop finger 38 is spaced from the center rail trim piece 24. Alternatively, the outward pivoting movement of the center rail trim piece 24 could be limited by a short cable or a pin.

A spring 54 is shown in FIG. 3 that is disposed between the center rail trim piece 24 and the center rail link 22. The spring 54 biases the center rail assembly 20 into its outwardly pivoted position as shown in FIG. 6. The spring is compressed in FIG. 7 when the front link 44 is received in the nesting slot 50. Alternatively, a clock spring could be provided as part of the pivot bracket 28, pivot pin 30 and hinge flange assembly 32 that could be used to outwardly bias the hinge flange 32. The illustrated spring 54 is a helical spring, however, a leaf spring could also be used to bias the center rail trim piece 20 in the outboard direction.

Referring to FIGS. 3-7, a cam block 42 is assembled to the center rail trim piece 24. As shown in FIGS. 4 and 6, the front link 44 is disposed above the cam surface 48 of the cam block 42. As the front link 44 moves toward the cam block 42, the cam surface 48 pulls the center rail trim piece 24 in the inboard direction until, as shown in FIGS. 5 and 7, the front link 44 is received in the nesting slot 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. A convertible top comprising:
a plurality of links including a center rail link, a front rail link and a rear rail link that move the convertible top in a fore-and-aft direction;
a center rail trim piece that carries a window seal and is assembled to the center rail link to move with the center rail link in the fore-and-aft direction and also moves in a laterally outboard direction when the top is retracted and in a laterally inboard direction when the top is extended;
a pivot bracket that includes a pivot pin that connects a first end of the center rail trim piece to the center rail link, wherein a second end of the center rail trim piece pivots about the pin to move in the laterally outboard direction and in the laterally inboard direction;
a stop member secured to one of the center rail trim piece and the center rail link that limits lateral movement of the center rail trim piece relative to the center rail link; and
further comprising a cam block secured to one of the center rail trim piece and the center rail link that guides lateral movement of the center rail trim piece relative to the center rail link.

2. The convertible top of claim 1 wherein the stop member is a stop finger attached to the center rail link, wherein the center rail trim piece defines an aperture, and wherein the stop finger extends through the aperture to engage a portion of the center rail trim piece that faces away from the center rail link.

3. The convertible top of claim 1 wherein the cam block is secured to the center rail trim piece, the cam block defines a nesting slot and includes a cam surface that leads into the nesting slot, wherein the front rail link follows the cam surface as the top is extended until the front rail link is received in the nesting slot to move the center rail trim piece in the inboard direction.

4. The convertible top of claim 1 further comprising a spring operatively connected to the center rail trim piece and the center rail link that biases the center rail trim piece in the outboard direction.

5. A rail assembly for a convertible top that has a plurality of bows that support a flexible cover that is moved in a longitudinal direction between a retracted position and an extended position, the rail assembly comprising:
 a rail link that cooperates with a plurality of other rail links to move the convertible top between the retracted position and the extended position; and
 a trim piece that supports a window seal, wherein the trim piece is attached to the rail link by a pivot pin that connects a first end portion of the trim piece to the rail link, and wherein a second end portion is moved in a lateral direction that is perpendicular to the longitudinal direction as the convertible top is moved between the retracted position and the extended position to locate the trim piece at a selected lateral position relative to the rail link;
 a pivot bracket that supports the pivot pin that connects the first end portion of the trim piece to the rail link, wherein the second end of the trim piece pivots about the pin to move in a laterally outboard direction and in a laterally inboard direction;
 a stop member secured to one of the trim piece and the rail link that limits lateral movement of the trim piece relative to the rail link; and
 further comprising a cam block secured to one of the trim piece and the rail link that guides lateral movement of the trim piece relative to the rail link.

6. The rail assembly of claim 5 wherein the stop member is a stop finger attached to the rail link, wherein the trim piece defines an aperture, and wherein the stop finger extends through the aperture to engage a portion of the trim piece that faces away from the rail link.

7. The rail assembly of claim 5 wherein the cam block is secured to the trim piece, the cam block defines a nesting slot and includes a cam surface that leads into the nesting slot, wherein the rail link follows the cam surface as the top is extended until the rail link is received in the nesting slot to move the trim piece in an inboard direction.

8. The rail assembly of claim 5 further comprising a spring operatively connected to the trim piece and the rail link that biases the trim piece in an outboard direction.

9. A convertible top comprising:
 a plurality of articulated rail links that move the convertible top in a fore-and-aft direction;
 a trim piece that carries a window seal and is assembled to at least one of the rail links to move with the at least one of the rail links in the fore-and-aft direction and also moves in a lateral direction outwardly when the top is retracted and in a lateral direction inwardly when the top is extended;
 a stop member secured to one of the trim piece and the at least one of the rail links that limits lateral movement of the trim piece relative to the at least one of the rail links; and
 a cam block secured to one of the trim piece and the at least one of the rail links that guides the lateral movement of the trim piece relative to the at least one of the rail links.

10. The convertible top of claim 9 further comprising a pivot bracket that includes a pivot pin that connects a first end of the trim piece to the at least one of the rail links, wherein a second end of the trim piece pivots about the pin to move the trim piece in the lateral direction outwardly and in the lateral direction inwardly.

11. The convertible top of claim 9 wherein the stop member is a stop finger attached to the at least one of the rail links, wherein the trim piece defines an aperture, and wherein the stop finger extends through the aperture to engage a portion of the trim piece that faces away from the at least one of the rail links.

12. The convertible top of claim 9 wherein the cam block is secured to the trim piece, the cam block defines a nesting slot and includes a cam surface that leads into the nesting slot, wherein the at least one of the rail links follows the cam surface as the top is extended until the at least one of the rail links is received in the nesting slot to move the trim piece inwardly in the lateral direction.

13. The convertible top of claim 9 further comprising a spring operatively connected to the trim piece and the at least one of the rail links, wherein the spring biases the trim piece outwardly in the lateral direction.

14. The convertible top of claim 9 wherein the convertible top is a Z-fold convertible top having a front panel that functions as a partial tonneau when the convertible top is retracted, and wherein a four bar linkage connects the front panel to at least one of the rail links of the convertible top.

\* \* \* \* \*